(12) United States Patent
Iwata et al.

(10) Patent No.: US 10,168,720 B2
(45) Date of Patent: Jan. 1, 2019

(54) LINEAR POWER SUPPLY AND ELECTRONIC APPARATUS USING SAME

(71) Applicant: Rohm Co., Ltd., Kyoto (JP)

(72) Inventors: Kotaro Iwata, Kyoto (JP); Hiroki Inoue, Kyoto (JP); Zhencheng Jin, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/544,107

(22) PCT Filed: Dec. 24, 2015

(86) PCT No.: PCT/JP2015/085983
§ 371 (c)(1),
(2) Date: Jul. 17, 2017

(87) PCT Pub. No.: WO2016/125412
PCT Pub. Date: Aug. 11, 2016

(65) Prior Publication Data
US 2017/0351285 A1 Dec. 7, 2017

(30) Foreign Application Priority Data
Feb. 5, 2015 (JP) ................. 2015-021367

(51) Int. Cl.
*G05F 1/40* (2006.01)
*G05F 1/59* (2006.01)
(Continued)

(52) U.S. Cl.
CPC ............. *G05F 1/59* (2013.01); *G05F 1/56* (2013.01); *G05F 1/565* (2013.01); *B60R 16/033* (2013.01)

(58) Field of Classification Search
CPC .......... G05F 1/577; G05F 1/575; H02M 1/08; H02M 2001/009; H03K 2217/0081; Y10T 307/729
(Continued)

(56) References Cited

U.S. PATENT DOCUMENTS 6,396,249 B1 * 5/2002 Itakura .............. H03K 17/0822
323/273
6,455,953 B1 * 9/2002 Lam ..................... H02J 9/005
307/23
(Continued)

FOREIGN PATENT DOCUMENTS

| CN | 201557075 U | 8/2010 |
| CN | 103178713 A | 6/2013 |

(Continued)

OTHER PUBLICATIONS

Japanese Patent Office, International Search Report for PCT/JP2015/085983 dated Apr. 5, 2016 with English translation (3 pages).
(Continued)

*Primary Examiner* — Rajnikant Patel
(74) *Attorney, Agent, or Firm* — Fish & Richardson P.C.

(57) ABSTRACT

A linear power supply (1) includes a P-channel (or PNP) first output transistor (10) connected between an input terminal of an input voltage (Vin) and an output terminal of an output voltage (Vout), an N-channel (or NPN) second output transistor (20) connected in parallel to the first output transistor (10), and a control circuit (30) that switches between a first mode and a second mode according to the input voltage (Vin), in which the first mode uses the first output transistor (10) while the second mode uses the second output transistor (20) as an output transistor that generates the output voltage (Vout) from the input voltage (Vin).

17 Claims, 9 Drawing Sheets

(51) Int. Cl.
  *G05F 1/56* (2006.01)
  *G05F 1/565* (2006.01)
  *B60R 16/033* (2006.01)

(58) Field of Classification Search
  USPC .............. 323/222, 224, 225, 271–276, 280, 323/281–285, 312–316; 327/309, 538, 327/540–546
  See application file for complete search history.

(56) References Cited

U.S. PATENT DOCUMENTS

| | | | | |
|---|---|---|---|---|
| 6,664,773 | B1* | 12/2003 | Cunnac | G05F 1/575 323/277 |
| 6,897,715 | B2* | 5/2005 | Barber, Jr. | G05F 1/56 323/316 |
| 6,987,715 | B2* | 1/2006 | Kobayashi | G11B 7/0053 369/124.04 |
| 7,609,039 | B2* | 10/2009 | Hasegawa | H02M 3/1588 323/273 |
| 2006/0132108 | A1 | 6/2006 | Teggatz et al. | |
| 2009/0273237 | A1 | 11/2009 | Inoue | |
| 2012/0001606 | A1 | 1/2012 | Chen | |
| 2013/0038314 | A1 | 2/2013 | Nakashima | |

FOREIGN PATENT DOCUMENTS

| | | |
|---|---|---|
| CN | 103529894 A | 1/2014 |
| EP | 1959327 A1 | 8/2008 |
| JP | H04-055608 U | 5/1992 |
| JP | 2546320 Y2 | 5/1997 |
| JP | 2003-348766 | 12/2003 |
| JP | 2007-011947 | 1/2007 |
| JP | 2007-157070 A1 | 6/2007 |
| JP | 2010-211721 | 9/2010 |
| JP | 2015-102999 | 6/2015 |

OTHER PUBLICATIONS

European Patent Office; Extended European Search Report dated Aug. 13, 2018 in corresponding European patent application No. 15881229.7.

Japanese Patent Office; Office Action dated Aug. 21, 2018 (with English Translation) in corresponding Japanese patent application No. 2015-021367.

Korean Patent Office; Office Action dated Oct. 23, 2018 in Korean Application No. 10-2017-7021658 (with English Translation).

* cited by examiner

FIG. 3A  (a) Nch

FIG. 3B  (b) Pch

FIG. 3C  (c) Pch+Nch

LINEAR POWER SUPPLY AND ELECTRONIC APPARATUS USING SAME

TECHNICAL FIELD

The present invention relates to a linear power supply such as a series regulator or a low drop-out (LDO) regulator, and to an electronic apparatus using the same.

BACKGROUND ART

Conventionally, a linear power supply that generates an output voltage Vout from an input voltage Vin by continuously controlling conduction degree of an output transistor is used for various applications. Note that linear power supplies are roughly classified into two types: one uses an N-channel (or an NPN) output transistor, and the other uses a P-channel (or a PNP) output transistor.

As an example of a conventional technique related to the above, there is Patent Document 1.

LIST OF CITATIONS

Patent Literature

Patent Document 1: JP-A-2010-211721

SUMMARY OF THE INVENTION

Technical Problem

When using an N-channel (or an NPN) output transistor, a gate voltage (or a base voltage) of the output transistor does not have much dependency on an input voltage Vin. Therefore, it is possible to use a zener diode or the like for generating a gate voltage (or a base voltage) of the output transistor to adopt a simple driving method so that stable driving can be realized. Thus, it is possible to reduce a circuit scale of the linear power supply.

However, when using an N-channel (or an NPN) output transistor, the input voltage Vin must satisfy at least the condition Vin≥Vout+Vth (where Vth is an on threshold voltage of the output transistor). In addition, depending on a circuit structure of the linear power supply, it is necessary to superimpose more circuit drive voltages (such as a drain-source voltage Vds of a field-effect transistor or a saturation voltage Vsat of a bipolar transistor) on the input voltage Vin. For this reason, there is a problem that it is difficult to realize low voltage drive when using an N-channel (or an NPN) output transistor.

On the other hand, when using a P-channel (or a PNP) output transistor, it is possible to control conduction degree of the output transistor by a gate voltage (or a base voltage) lower than the input voltage Vin. Therefore, compared with a linear power supply using an N-channel (or an NPN) output transistor, it is easy to realize the low voltage drive, and hence a desired output voltage Vout can be generated from a lower input voltage Vin.

However, when using a P-channel (or a PNP) output transistor, a source voltage (or an emitter voltage) of the output transistor has a dependency on the input voltage Vin. Therefore, in order to stably generate the output voltage, it becomes necessary to use a complicated negative feedback control using a differential amplifier circuit or the like, and hence there is a problem that the circuit scale of the linear power supply is increased.

In view of the above-mentioned problem found by the inventors, it is an object of the invention described in this specification to provide a linear power supply that can realize both low voltage drive and stable drive with a small-scale circuit structure, and an electronic apparatus using this linear power supply.

Means for Solving the Problem

A linear power supply according to the invention described in this specification includes a P-channel or PNP first output transistor connected between an input terminal of an input voltage and an output terminal of an output voltage, an N-channel or NPN second output transistor connected in parallel to the first output transistor, and a control circuit arranged to switch between a first mode and a second mode in accordance with the input voltage, the first mode using the first output transistor while the second mode using the second output transistor as the output transistor to generate the output voltage from the input voltage (first structure).

Note that in the linear power supply having the first structure, it is preferred to adopt a structure in which the control circuit selects the first mode in a low input voltage condition and selects the second mode in a non-low input voltage condition (second structure).

In addition, in the linear power supply having the first or the second structure, it is preferred to adopt a structure in which the control circuit includes a first control unit arranged to generate a first control voltage according to the input voltage so as to supply the first control voltage to the first output transistor, and a second control unit arranged to generate a predetermined second control voltage so as to supply the second control voltage to the second output transistor (third structure).

In addition, in the linear power supply having the third structure, it is preferred to adopt a structure in which the first control unit turns on/off the first output transistor in accordance with a result of comparison between the input voltage and a predetermined threshold value voltage (fourth structure).

In addition, in the linear power supply having the fourth structure, it is preferred to adopt a structure in which the first control unit includes an upper side current source connected between the input terminal of the input voltage and a control terminal of the first output transistor so as to generate an upper side current, a lower side current source connected between the control terminal of the first output transistor and a ground terminal so as to generate a lower side current, and an input voltage monitoring unit arranged to turn on/off the upper side current source in accordance the result of comparison between the input voltage and the threshold value voltage (fifth structure).

In addition, in the linear power supply having the fifth structure, it is preferred to adopt a structure in which the input voltage monitoring unit includes a current source having a first terminal connected to an application terminal of the input voltage, a diode or a diode array having an anode connected to a second terminal of the current source and a cathode connected to a control terminal of the upper side current source, and a zener diode having a cathode connected to the control terminal of the upper side current source and an anode connected to the ground terminal (sixth structure).

In addition, in the linear power supply having the third structure, it is preferred to adopt a structure in which the first control unit gradually changes a conduction degree of the first output transistor in accordance with the input voltage (seventh structure).

In addition, in the linear power supply having the seventh structure, it is preferred to adopt a structure in which the first control unit includes an upper side current source connected between the input terminal of the input voltage and the control terminal of the first output transistor so as to generate an upper side current, a lower side current source connected between the control terminal of the first output transistor and a ground terminal so as to generate a lower side current, and an input voltage monitoring unit arranged to gradually change current value of the upper side current in accordance with the input voltage (eighth structure).

In addition, in the linear power supply having the eighth structure, it is preferred to adopt a structure in which the input voltage monitoring unit includes a diode or a diode array having an anode connected to an application terminal of the input voltage, a resistor having a first terminal connected to a cathode of the diode or the diode array, and a current mirror arranged to mirror a current flowing from a second terminal of the resistor so as to generate an input monitoring current, in which the upper side current source generates the upper side current in accordance with the input monitoring current (ninth structure).

In addition, in the linear power supply having any one of the third to ninth structures, it is preferred to adopt a structure in which the second control unit includes a zener diode having a cathode connected to a control terminal of the second output transistor and an anode connected to a ground terminal, and a current source arranged to supply a constant current to the zener diode (tenth structure).

In addition, an electronic apparatus described in this specification includes the linear power supply having any one of the first to tenth structures arranged to generate the output voltage from the input voltage, and a reference voltage source arranged to generate a predetermined reference voltage from the output voltage (eleventh structure).

Note that in the electronic apparatus having the eleventh structure, it is preferred to adopt a structure in which the control circuit performs switching from the first mode to the second mode after the input voltage becomes higher than a voltage obtained by adding an on threshold voltage of the second output transistor to an operable voltage of the reference voltage source (twelfth structure).

Advantageous Effects of the Invention

According to the linear power supply disclosed in this specification and the electronic apparatus using this linear power supply, it is possible to realize both low voltage drive and stable drive with a small-scale circuit structure.

DESCRIPTION OF EMBODIMENTS

<Linear Power Supply>

Figure 1:
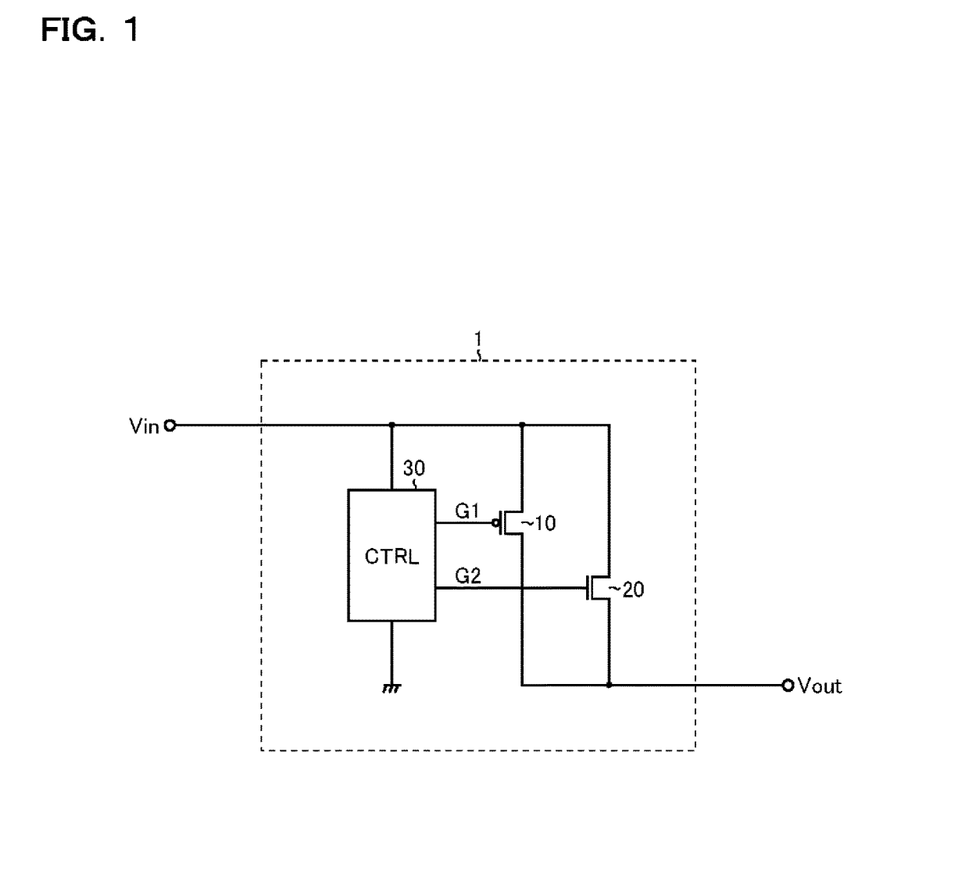
FIG. 1 is a block diagram illustrating an overall structure of a linear power supply 1.

FIG. 1 is a block diagram illustrating an overall structure of a linear power supply 1. The linear power supply 1 of this structural example includes a first output transistor 10, a second output transistor 20, and a control circuit 30.

The first output transistor 10 is a P-channel metal oxide semiconductor (MOS) field-effect transistor having a source connected to an input terminal of an input voltage Vin, a drain connected to an output terminal of an output voltage Vout, and a gate connected an application terminal of a first control voltage G1. Note that it is also possible to use a PNP bipolar transistor as the first output transistor 10.

The second output transistor 20 is an N-channel MOS field-effect transistor having a drain connected to the input terminal of the input voltage Vin, a source connected to the output terminal of the output voltage Vout, and a gate connected to an application terminal of a second control voltage G2. In other words, the second output transistor 20 is connected in parallel to the first output transistor 10. Note that it is also possible to use an NPN bipolar transistor as the second output transistor 20.

The control circuit 30 generates the first control voltage G1 and the second control voltage G2 to control the first output transistor 10 and the second output transistor 20, respectively. In particular, the control circuit 30 has a function of switching between a first mode and a second mode in accordance with the input voltage Vin, in which the first mode uses the first output transistor 10 while the second mode uses the second output transistor 20 as the output transistor that generates the output voltage Vout from the input voltage Vin. Note that the control circuit 30 selects the first mode in a low input voltage condition (i.e., a state where the input voltage Vin is lower than a predetermined value), while it selects the second mode in a non-low input voltage condition (i.e., a state where the input voltage Vin is higher than the predetermined value).

In the first mode, the first output transistor 10 is fully turned on without using a complicated negative feedback control so that the input voltage Vin is output as the output voltage Vout as it is. On the other hand, in the second mode, a conduction degree of the second output transistor 20 is controlled by a simple drive method using a zener diode and the like so that a desired output voltage Vout is generated from the input voltage Vin.

In other words, when the input voltage Vin is low, the P-channel (or a PNP) first output transistor 10 is used for realizing low voltage drive. When the input voltage Vin becomes sufficiently high, the N-channel (or an NPN) second output transistor 20 is used for realizing stable drive independent of input variation.

In this way, according to the linear power supply 1 of this structural example, it is possible to realize both low voltage drive and stable drive with a small-scale circuit structure by selectively using the P-channel (or a PNP) first output transistor 10 and the N-channel (or an NPN) second output transistor 20 connected in parallel to each other, appropriately in accordance with the input voltage Vin.

Control Circuit (First Structural Example)

Figure 2:
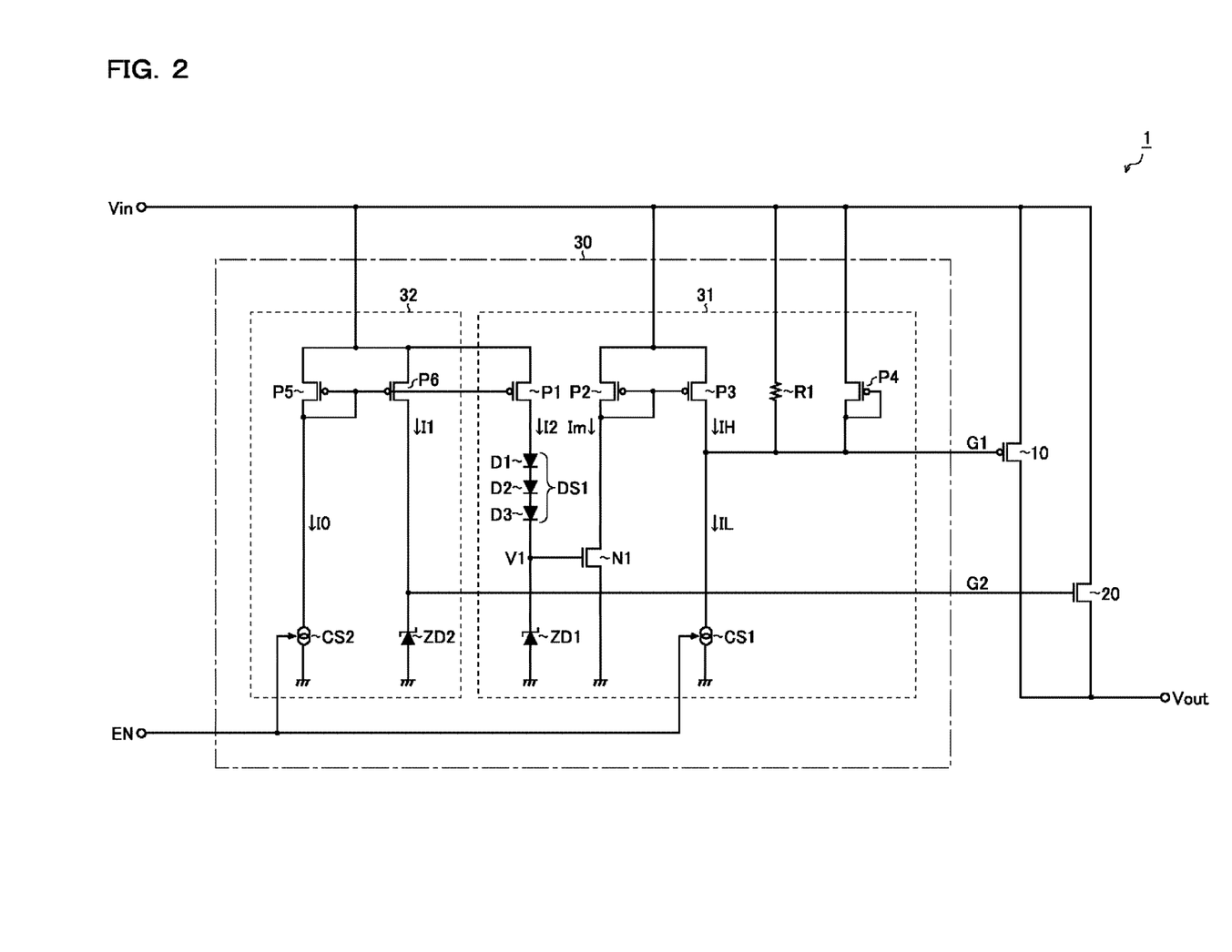
FIG. 2 is a circuit diagram illustrating a first structural example of a control circuit 30.

FIG. 2 is a circuit diagram illustrating a first structural example of the control circuit 30. The control circuit 30 of this structural example includes a first control unit 31 that generates the first control voltage G1 according to the input voltage Vin and supplies the first control voltage G1 to the first output transistor 10, and a second control unit 32 that generates the predetermined second control voltage G2 and supplies the second control voltage G2 to the second output transistor 20.

The first control unit 31 includes P-channel MOS field-effect transistors P1 to P4, an N-channel MOS field-effect transistor N1, a diode array DS1, a zener diode ZD1, a current source CS1, and a resistor R1. In addition, the second control unit 32 includes P-channel MOS field-effect transistors P5 and P6, a zener diode ZD2, and a current source CS2. Note that in the example of this diagram, three diodes D1 to D3 are connected in series as the diode array DS1, but the number of diodes may be one, two, four or more.

A connection relationship of the circuit elements is described. The sources of the transistor P1, the transistor P5, and the transistor P6 are all connected to the input terminal of the input voltage Vin. The gates of the transistor P1, the transistor P5, and the transistor P6 are all connected to the drain of the transistor P5. The drain of the transistor P5 is connected to a first terminal of the current source CS2. A second terminal of the current source CS2 is connected to a ground terminal. A control terminal of the current source CS2 is connected to an input terminal of an enable signal EN. Note that the current source CS2 becomes operating state when the enable signal EN is high level (logic level in an enabled state), and becomes halt state when the enable signal EN is low level (logic level in a disabled state). The drain of the transistor P6 and the cathode of the zener diode ZD2 are both connected to the output terminal of the second control voltage G2 (i.e. the gate of the second output transistor 20). The anode of the zener diode ZD2 is connected to the ground terminal.

The drain of the transistor P1 is connected to the anode of the diode array DS1. The cathode of the diode array DS1 and the cathode of the zener diode ZD1 are both connected to the gate of the transistor N1. The source of the transistor N1 is connected to the ground. The drain of the transistor N1 is connected to the drain of the transistor P2.

The sources of the transistors P2 and P3 are both connected to the input terminal of the input voltage Vin. The gates of the transistors P2 and P3 are both connected to the drain of the transistor P2. The drain of the transistor P3 and a first terminal of the current source CS1 are both connected to the output terminal of the first control voltage G1 (i.e. the gate of the first output transistor 10). A second terminal of the current source CS1 is connected to the ground terminal. The control terminal of the current source CS1 is connected to the input terminal of the enable signal EN. Note that the current source CS1 becomes operating state when the enable signal EN is high level (logic level in the enabled state), and becomes halt state when the enable signal EN is low level (logic level in the disabled state).

The first terminal of the resistor R1 and the source of the transistor P4 are both connected to the input terminal of the input voltage Vin. The second terminal of the resistor R1 and the gate and the drain of the transistor P4 are both connected to the output terminal of the first control voltage G1.

Next, functions of the circuit elements are described. The transistors P2 and P3 function as an upper side current source that mirrors an input monitoring current Im flowing in the transistor N1 so as to generate an upper side current IH. On the other hand, the current source CS1 functions as a lower side current source that generates a lower side current IL (where, IL<IH). Note that the gate of the transistor N1 functions as a control terminal for turning on/off the upper side current source (and hence the input monitoring current Im) in accordance with the input voltage Vin.

In addition, the transistor P1, the diode array DS1, and the zener diode ZD1 function as an input voltage monitoring unit, which turns on/off the upper side current source in accordance with a result of comparison between the input voltage Vin and a predetermined threshold value voltage (more precisely a result of comparison between the gate voltage V1 of the transistor N1 (=Vin−3Vf) and an on threshold voltage Vth(N1)). Note that the transistors P1 and P5 function as a current source that mirrors a reference current I0 generated by current source CS0 so as to supply a drive current I2 to the input voltage monitoring unit.

In addition, the transistors P5 and P6 function as a current source that mirrors the reference current I0 so as to supply a drive current I1 to the zener diode ZD1.

Next, operation of the control circuit 30 having the above structure is described in detail. In the low input voltage condition (V1<Vth(N1)) of the input voltage Vin, the transistor N1 is turned off. Therefore, the input monitoring current Im does not flow in the transistors N1 and P2, and hence the upper side current IH does not flow in the transistor P3. As a result, the first control voltage G1 is pulled down to low level by the lower side current IL, and hence the first output transistor 10 is fully turned off. In this case, the output voltage Vout becomes substantially equal to the input voltage Vin.

In addition, while the first output transistor 10 is fully turned off, a high voltage that is substantially equal to the input voltage Vin is applied to the source of the second output transistor 20. Therefore, the gate-source voltage of the second output transistor 20 is always lower than the on threshold voltage Vth, and hence the second output transistor 20 is turned off.

In this way, in the first mode that is selected in the low input voltage condition of the input voltage Vin, the first output transistor 10 is fully turned off without using the complicated negative feedback control, and hence the input voltage Vin is output as the output voltage Vout as it is.

After that, when the input voltage Vin is increased so as to become the non-low input voltage condition (V1≥Vth), the transistor N1 is turned on. Therefore, the input monitoring current Im flows in the transistors N1 and P2, and hence the upper side current IH flows in the transistor P3. As a result, the first control voltage G1 is increased so that the first output transistor 10 is turned off. Note that, even if the input voltage Vin is increased by any level, the gate voltage V1 of the transistor N1 is clamped by the zener diode ZD1, and hence the upper monitoring current Im does not become excessive. In addition, in order to restrict the upper monitoring current Im, a resistor should be connected in series to the drain (or source) of the transistor N1.

When the first output transistor 10 is turned off, the second output transistor 20 is turned on with a conduction degree corresponding to the second control voltage G2. In this case, the linear power supply 1 generates the output voltage Vout (=G2−Vth) obtained by subtracting the on threshold voltage Vth of the second output transistor 20 from the second control voltage G2.

Note that when the input voltage Vin is sufficiently increased, the second control voltage G2 is clamped at a breakdown voltage VZD2 of the zener diode ZD2. Therefore, when the linear power supply 1 steadily outputs, it generates the output voltage Vout (=VZD2−Vth) obtained by subtracting the on threshold voltage Vth from the breakdown voltage VZD2.

In this way, in the second mode that is selected in the non-low input voltage condition of the input voltage Vin, the conduction degree of the second output transistor 20 is controlled by a simple drive method using the zener diode ZD2, and hence the desired output voltage Vout is generated from the input voltage Vin.

Note that if the off timing of the first output transistor 10 is delayed due to a rapid increase of the input voltage Vin or the like, an overshoot may occur in the output voltage Vout. In order to avoid such malfunction, it is important to design the elements and the circuit so as to improve response performances of the first output transistor 10 and the first control unit 31.

In addition, the malfunction described above may be prevented in advance by connecting a clamp element (to which the transistor P4 of this diagram corresponds) between the gate and the source of the first output transistor 10, because an upper limit can be set in the conduction degree of the first output transistor 10.

In addition, if an increase of a circuit scale is allowed, it is useful to dispose an overshoot protection circuit that forcibly turns off the first output transistor 10 when the output voltage Vout becomes higher than a predetermined upper limit value.

In addition, the first control unit 31 of this structural example adopts a voltage adjusting method of the gate voltage V1 by the diode array DS1 (i.e., the diodes D1 to D3) as an off threshold value setting unit of the first output transistor 10. A forward drop voltage Vf of each of the diodes D1 to D3 has relatively large negative temperature characteristics. Therefore, as the ambient temperature is lower, the gate voltage V1 of the transistor N1 becomes lower, and hence the off timing of the first output transistor 10 (i.e., switch timing from the first mode to the second mode) is delayed more. In other words, as the ambient temperature is lower, the period of outputting the input voltage Vin as the output voltage Vout becomes longer so that the output voltage Vout is kept at a high voltage for longer period.

Here, a post-stage circuit that is supplied with the output voltage Vout generally needs higher voltage for starting as the ambient temperature is lower. Therefore, the structure in which the off timing of the first output transistor 10 varies depending on the temperature characteristics of the forward drop voltage Vf is proper as circuit design.

In addition, in the first control unit 31 of this structural example, the drive current I2 flowing in the diode array DS1 is always kept at a constant value independently of the input voltage Vin. Therefore, it is more advantageous in circuit current than a structure in which the input voltage Vin is divided for generating the gate voltage V1. In addition, in the first control unit 31 of this structural example in which the gate voltage V1 is generated without using a resistor dividing circuit, it is not necessary to use a high resistance element for reducing the drive current I2, and hence it is advantageous also in a circuit area.

Figure 3A:
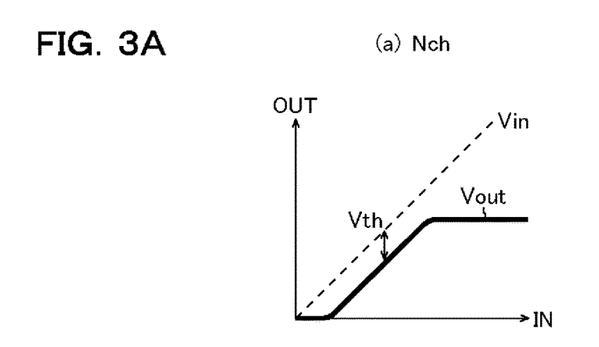
FIG. 3A is an operation concept diagram of the linear power supply 1 (N-channel)
Figure 3B:
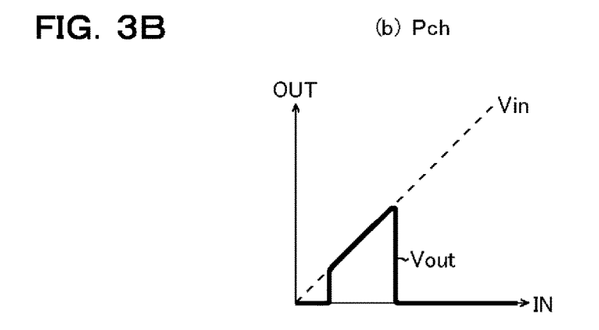
FIG. 3B is an operation concept diagram of the linear power supply 1 (P-channel)
Figure 3C:
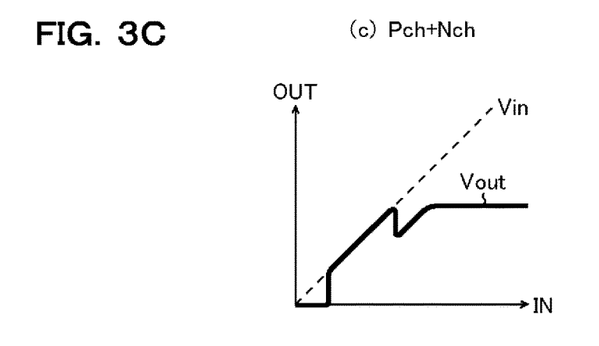
FIG. 3C is an operation concept diagram of the linear power supply 1 (P-channel plus N-channel)

FIGS. 3A to 3C are operation concept diagrams of the linear power supply 1. If only the N-channel (or an NPN) second output transistor 20 is used for output operation as illustrated in FIG. 3A, only the output voltage Vout (=Vin−Vth) obtained by subtracting the on threshold voltage Vth from the input voltage Vin can be output in the low input voltage condition of the input voltage Vin. For this reason, the linear power supply 1 adopting this structure is required to delay the start of the post-stage circuit until the input voltage Vin is sufficiently increased.

On the other hand, if the P-channel (or a PNP) first output transistor 10 is used for output operation as illustrated in FIG. 3B, the output voltage Vout that is substantially equal to the input voltage Vin can be output also in the low input voltage condition of the input voltage Vin. Therefore, it is possible to advance the start timing of the post-stage circuit. However, there is no negative feedback control during this operation, and hence the first output transistor 10 must be turned off until the output voltage Vout exceeds a target value.

FIG. 3C shows an output behavior in a case where the first output transistor 10 and the second output transistor 20 are used in combination. According to this output operation, both an advantage of the first output transistor 10 (low voltage drive) and an advantage of the second output transistor 20 (stable drive with a simple structure) can be enjoyed. Therefore, a headroom voltage of the linear power supply 1 (i.e., input voltage Vin that enables generation of the output voltage Vout that does not harm the operation of the post-stage circuit) can be increased by the on threshold voltage Vth of the second output transistor 20.

For example, a headroom voltage of 3 V or higher is necessary when using only the second output transistor 20, but the headroom voltage can be decreased to approximately 2 V by using both the first output transistor 10 and the second output transistor 20. Therefore, it is possible to expand the operable range of the input voltage Vin to lower level side.

<Application to Electronic Apparatus>

Figure 4A:
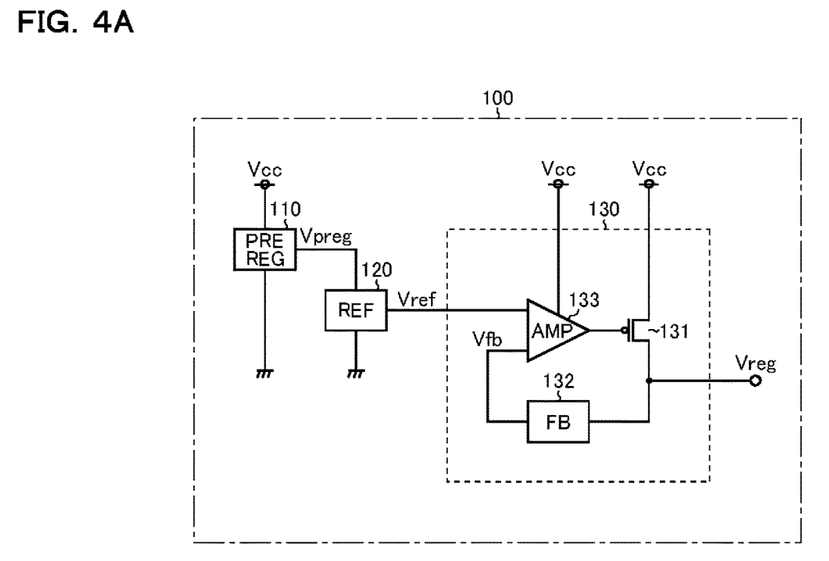
FIG. 4A is a block diagram illustrating a first example of an electronic apparatus using the linear power supply 1.

FIG. 4A is a block diagram illustrating a first example of an electronic apparatus using the linear power supply 1. An electronic apparatus 100 of FIG. 4A includes a preregulator 110, a reference voltage source 120, and a main regulator 130.

The preregulator 110 generates a predetermined prepower supply voltage Vpreg from a power supply voltage Vcc. The preregulator 110 is required to realize both the low voltage drive and the stable drive with a small-scale circuit structure as much as possible. Therefore, the linear power supply 1 described above that can satisfy this requirement is very preferable as the preregulator 110.

The reference voltage source 120 generates a predetermined reference voltage Vref from the prepower supply voltage Vpreg. In particular, if the power supply voltage Vcc has a large variation range, it is preferred not to directly generate the reference voltage Vref from the power supply voltage Vcc but to generate the reference voltage Vref from the prepower supply voltage Vpreg obtained by stabilizing the power supply voltage Vcc to a certain extent. With this structure, it is possible to stably generate the desired reference voltage Vref independently of a variation of the power supply voltage Vcc.

The main regulator 130 is a circuit block that generates an internal power supply voltage Vreg from the power supply voltage Vcc and includes a P-channel MOS field-effect transistor 131, a feedback voltage generation unit 132, and an operational amplifier 133.

The transistor 131 is an output transistor of the main regulator 130. The source of the transistor 131 is connected to the input terminal of the power supply voltage Vcc. The drain of the transistor 131 is connected to the output terminal of the internal power supply voltage Vreg. The gate of the transistor 131 is connected to the output terminal of the operational amplifier 133.

The feedback voltage generation unit 132 generates a feedback voltage Vfb corresponding to the internal power supply voltage Vreg (e.g. a divided voltage of the internal power supply voltage Vreg).

The operational amplifier 133 controls the gate of the transistor 131 so that the feedback voltage Vfb and the reference voltage Vref coincide each other (imaginary short).

Figure 4B:
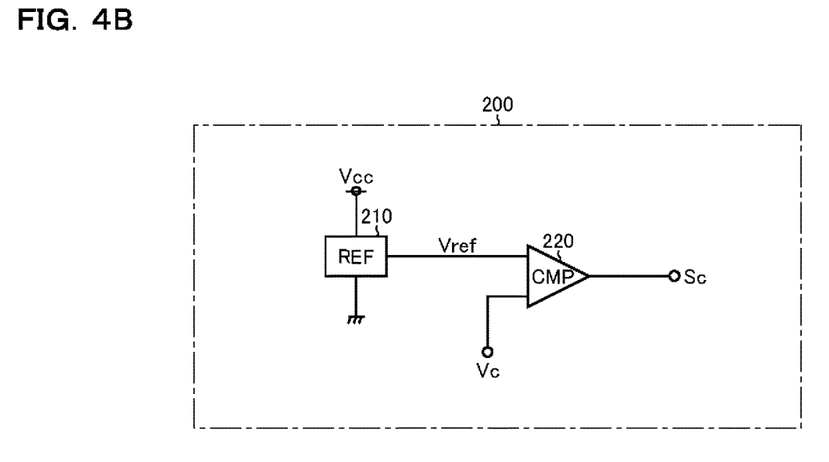
FIG. 4B is a block diagram illustrating a second example of the electronic apparatus using the linear power supply 1.

However, the application of the linear power supply 1 is not limited to the preregulator 110. For example, like an electronic apparatus 200 illustrated in FIG. 4B, the linear power supply 1 may be used as a reference voltage source 210 that generates the reference voltage Vref of a comparator 220 from the power supply voltage Vcc. In addition, FIG. 4A illustrates an example of the linear power supply that continuously controls the output transistor as the main regulator 130, but the form of the main regulator 130 is not limited in particular as long as the circuit structure needs the reference voltage. For example, it is naturally possible to adopt a switching power supply such as a DC-DC converter that needs the reference voltage and non-continuously controls the output transistor as the main regulator 130.

Figure 5:
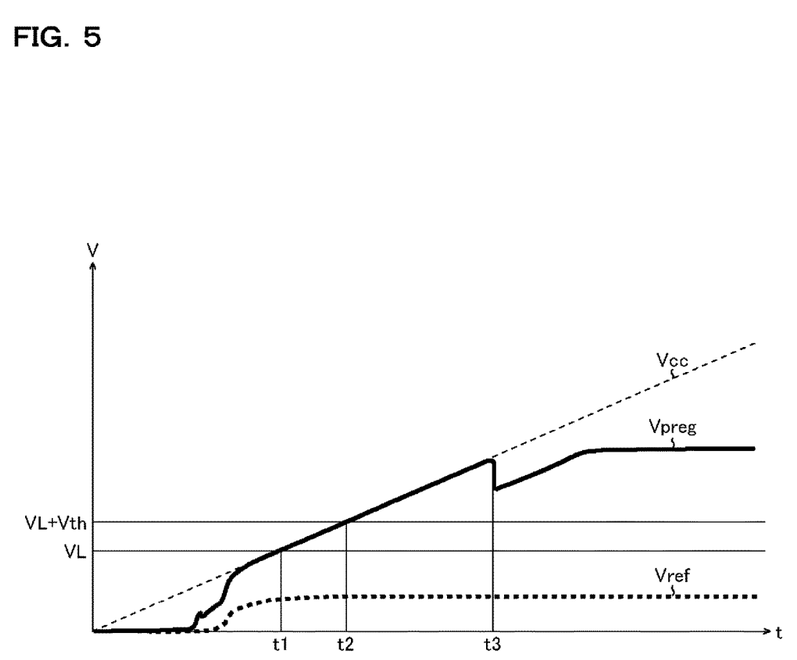
FIG. 5 is a timing chart illustrating an example of mode switch timing.

FIG. 5 is a timing chart illustrating an example of mode switch timing of the linear power supply 1. Note that in the example of this diagram, a case where the linear power supply 1 is used as the preregulator 110 of FIG. 4A is supposed for description.

After the power supply voltage Vcc is turned on, the prepower supply voltage Vpreg is increased to an operable voltage VL of the reference voltage source 120 (e.g. approximately 2 V) at time point t1, and then the reference voltage source 120 becomes ready to generate the desired reference voltage Vref. However, if the switching from the first mode to the second mode (turning off of the first output transistor 10) is performed at this time point, the prepower supply voltage Vpreg may again become lower than the operable voltage VL of the reference voltage source 120, and hence operation of the reference voltage source 120 may be harmed (the reference voltage Vref may be unintentionally decreased).

Therefore, the control circuit 30 performs the switching from the first mode to the second mode (turning off of the first output transistor 10) not at the time point t1 when Vin≥VL becomes satisfied but at time point t2 or after when Vin≥VL+Vth becomes satisfied. Note that in the example of this diagram, the switching from the first mode to the second mode is performed at time point t3 when the input voltage Vin is substantially equal to the target value of the prepower supply voltage Vpreg (>VL+Vth).

According to this mode switching operation, the prepower supply voltage Vpreg does not become lower than the operable voltage VL of the reference voltage source 120 when being switched to the second mode, and hence operation of the reference voltage source 120 is not harmed.

Control Circuit (Second Structural Example)

Figure 6:
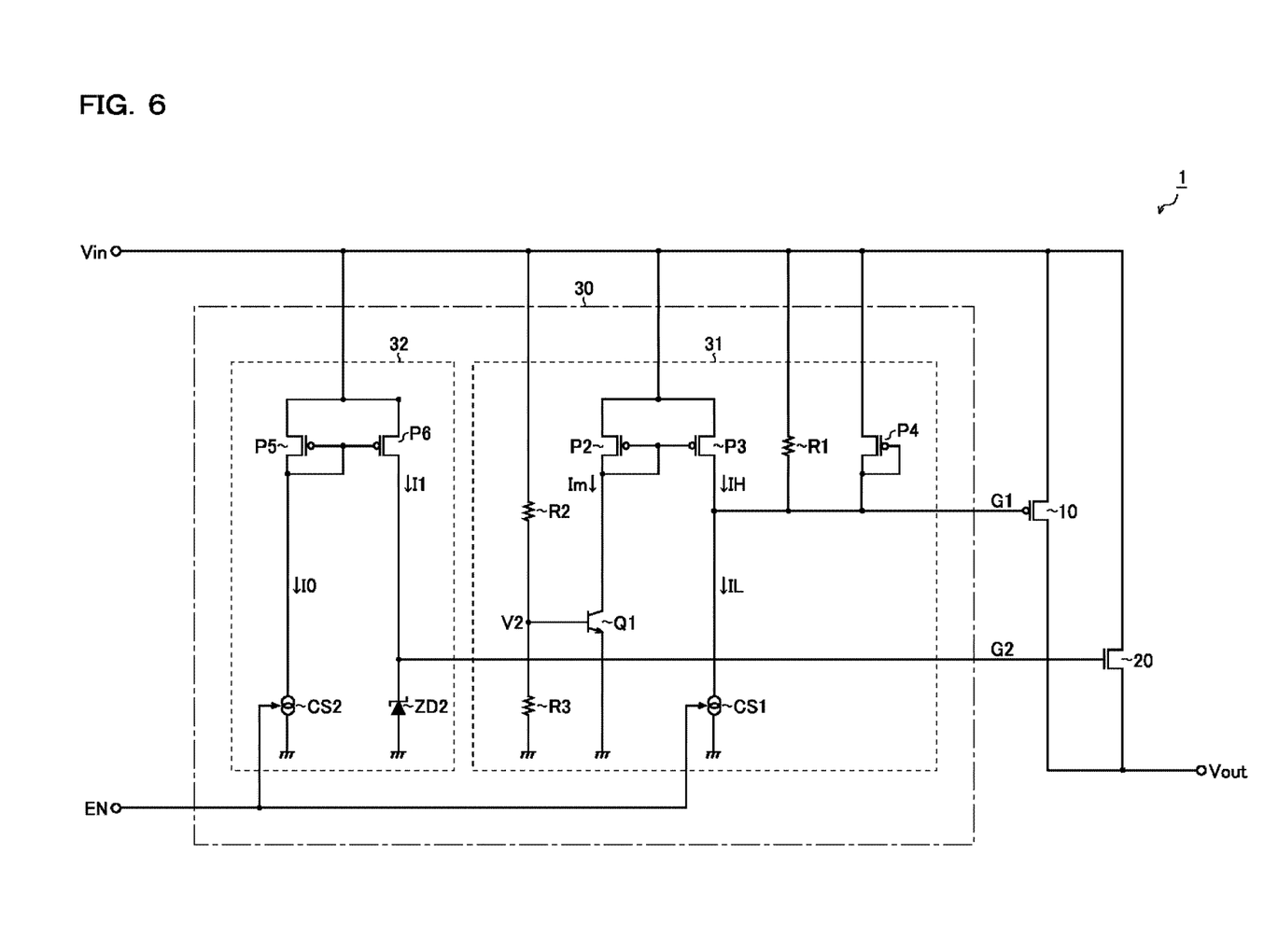
FIG. 6 is a circuit diagram illustrating a second structural example of the control circuit 30.

FIG. 6 is a circuit diagram illustrating a second structural example of the control circuit 30. The second structural example is basically the same as the first structural example and is characterized in that an NPN bipolar transistor Q1 and resistors R2 and R3 are disposed instead of the transistor P1, the diode array DS1, the zener diode ZD1, and the transistor N1 described above. Therefore, the same structural element as in the first structural example is denoted by the same numeral or symbol as that in FIG. 2 so that overlapping description is omitted, and a characteristic part of the second structural example is mainly described below.

The resistors R2 and R3 correspond to a first resistor and a second resistor, which are connected in series between the application terminal of the input voltage Vin and the ground terminal, and the connection node between them is connected to the base of the transistor Q1 (corresponding to the control terminal of the upper side current source). In other words, a base voltage V2 of the transistor Q1 has a voltage value (=Vin×(R3/R2+R3)) obtained by dividing the input voltage Vin.

The emitter of the transistor Q1 is connected to the ground terminal. The collector of the transistor N1 is connected to the drain of the transistor P2. The base of the transistor Q1 is connected to the connection node between the resistor R2 and the resistor R3 (application terminal of the base voltage V2). In this way, using voltage division by resistors, it is possible to realize a simpler structure.

Control Circuit (Third Structural Example)

Figure 7:
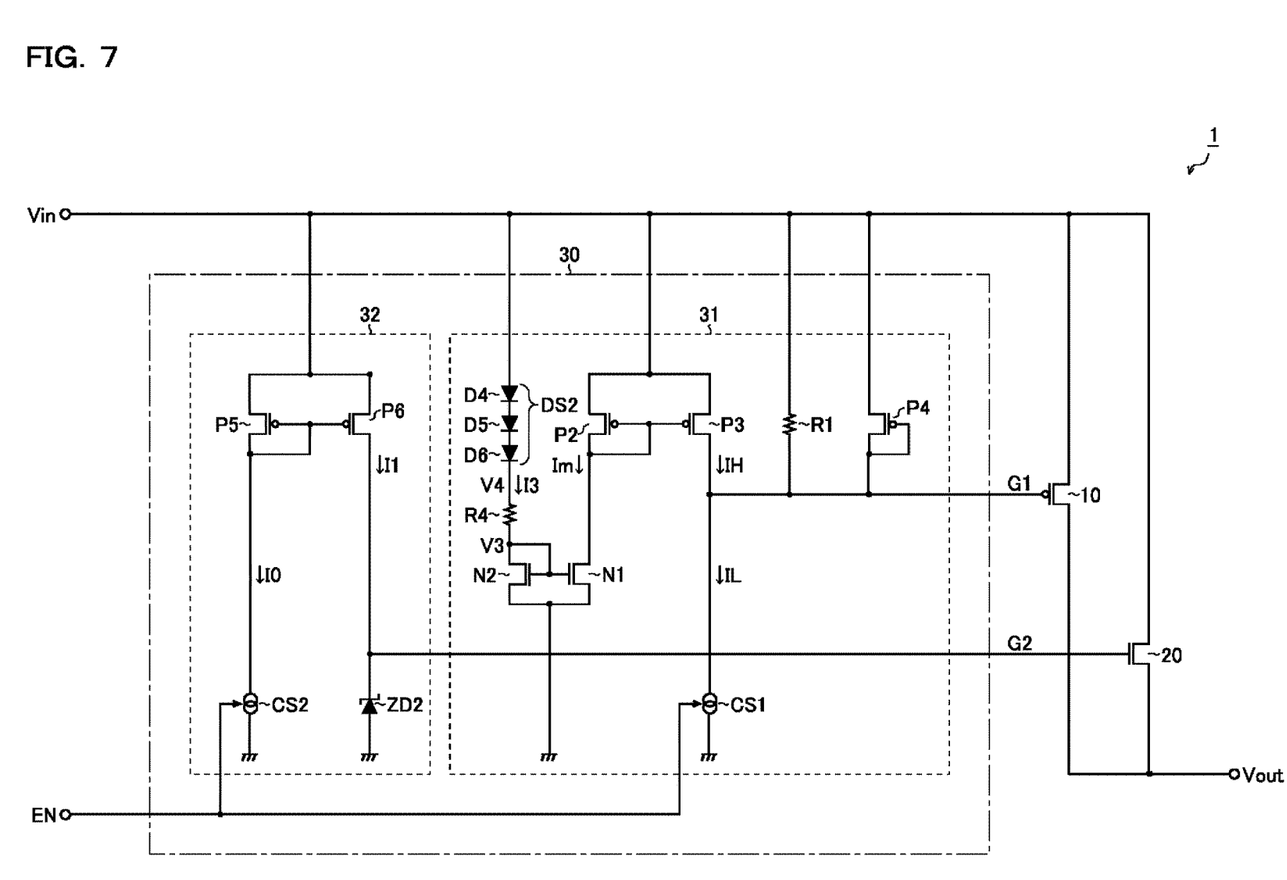
FIG. 7 is a circuit diagram illustrating a third structural example of the control circuit 30.

FIG. 7 is a circuit diagram illustrating a third structural example of the control circuit 30. The third structural example is basically the same as the first structural example and is characterized in that a transistor N2, a resistor R4, and a diode array DS2 are disposed instead of the transistor P1, the diode array DS1, and the zener diode ZD1 described above. Note that in the example of this diagram, three diodes D4 to D6 are connected in series as the diode array DS2, but the number of diodes may be one, two, four or more.

Similarly to the second structural example, the same structural element as in the first structural example is denoted by the same numeral or symbol as that in FIG. 2 so that overlapping description is omitted, and a characteristic part of the third structural example is mainly described below.

A connection relationship of the circuit elements is described. The anode of the diode array DS2 is connected to the input terminal of the input voltage Vin. The cathode of the diode array DS2 is connected to a first terminal of the resistor R4. A second terminal of the resistor R4 is connected to the drain of the transistor N2. The sources of the transistors N1 and N2 are connected to the ground terminal. The gate of the transistors N1 and N2 are both connected to the drain of the transistor N2.

The diode array DS2, the resistor R4, and the transistor N2 function as the input voltage monitoring unit, which turns on/off the upper side current source in accordance with a result of comparison between the input voltage Vin and a predetermined threshold value voltage (more precisely a result of comparison between the drain voltage V3 of the transistor N2 (=Vin−3Vf−I3×R4, where I3×R4 is substantially 0 V when starting the drive) and an on threshold voltage Vth(N2)). In other words, similarly to the first structural example, the diode array DS2 is an off threshold value setting unit for the first output transistor 10. Note that the resistor R4 functions as a control resistor for gradually changing the current I3 flowing in the transistor N2 in accordance with the input voltage Vin (accordingly the input monitoring current Im). In addition, the transistors N1 and N2 function as a current source that mirrors the current I3 so as to supply the drive current Im to the input voltage monitoring unit.

Next, operation of the control circuit 30 having the above structure is described in detail. When the gate voltage (=drain voltage) V3 of the transistor N2 is increased along with an increase of the input voltage Vin, the transistors N2 and N1 are turned on so that the input monitoring current Im starts to flow. Note that the input monitoring current Im is substantially equal to the current I3 because of pair characteristics of the transistors. When the input voltage Vin is further increased, a voltage V4 at the cathode of the diode array DS2 is increased. However, the gate voltage (=drain voltage) V3 of the transistor N2 is hardly changed, and hence voltage across both ends of the resistor R4 (=V4−V3) is gradually increased. When the voltage across both ends of the resistor R4 is gradually increased, the current I3 flowing in the resistor R4 is also gradually increased, and hence the input monitoring current Im flowing in the transistors N2 and N1 (accordingly in the transistor P2) is also gradually increased. As a result, the first control voltage G1 is also gradually increased, and hence the conduction degree of the first output transistor 10 is gradually decreased. On the other hand, as the conduction degree of the first output transistor 10 is decreased more, the gate-source voltage of the second output transistor 20 becomes higher, and therefore the conduction degree of the second output transistor 20 becomes larger.

In this way, when adopting the control circuit 30 of this structural example, overlapping switch operation is performed so that the first mode and the second mode are overlapped with each other.

Figure 8:
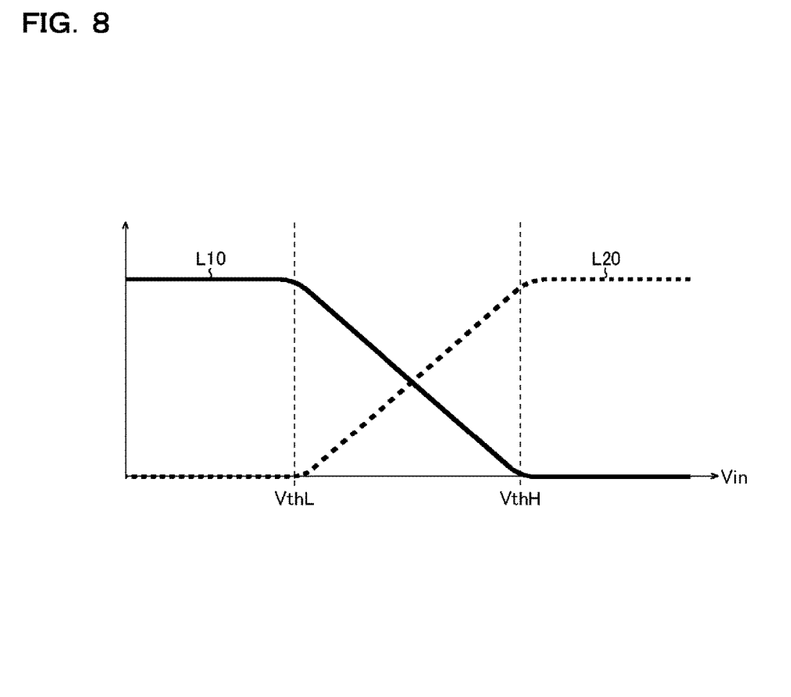
FIG. 8 is a concept diagram illustrating overlapping switch operation.

FIG. 8 is a concept diagram illustrating the overlapping switch operation. Note that a solid line L10 conceptually shows the conduction degree of the first output transistor 10, while a broken line L20 conceptually shows the conduction degree of the second output transistor 20. As understood from this diagram, in the voltage range of the input voltage Vin satisfying VinL<Vin<VinH, the first mode and the second mode are overlapped with each other. By performing this overlapping switch operation, more linear output operation can be realized.

<Application to Vehicle>

Figure 9:
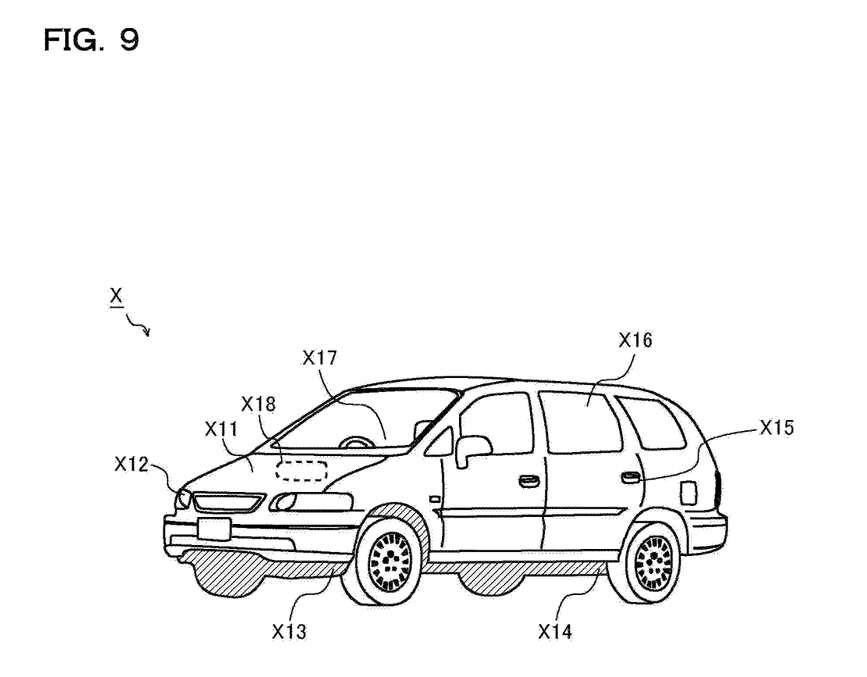
FIG. 9 is an external view illustrating a structural example of a vehicle X.

FIG. 9 is an external view illustrating a structural example of a vehicle X. The vehicle X of this structural example is equipped with various electronic apparatuses X11 to X18, which are supplied with battery voltage Vbat from a battery (not shown in this diagram). Note that mounting positions of the electronic apparatuses X11 to X18 in this diagram may be different from actual mounting positions, for convenience sake of illustration.

The electronic apparatus X11 is an engine control unit that performs controls related to an engine (injection control, electronic throttle control, idling control, oxygen sensor heater control, automatic cruise control, and the like).

The electronic apparatus X12 is a lamp control unit that performs turning on/off control of a high intensity discharged lamp (HID), a daytime running lamp (DRL), and the like.

The electronic apparatus X13 is a transmission control unit that performs controls related to a transmission.

The electronic apparatus X14 is a body control unit that performs controls related to movements of the vehicle X (anti-lock brake system (ABS) control, electric power steering (EPS) control, electronic suspension control, and the like).

The electronic apparatus X15 is a security control unit that performs drive controls of a door lock, anti-theft alarm, and the like.

The electronic apparatus X16 is an electronic apparatus such as a wiper, an electric door mirror, a power window, a damper (shock absorber), an electric sunroof, or an electric seat, which is mounted in the vehicle X at the shipping stage as standard equipment or a factory-installed option.

The electronic apparatus X17 is an electronic apparatus such as an in-vehicle audio/visual (A/V) apparatus, a car navigation system, or an electronic toll collection system (ETC), which is mounted in the vehicle X as a user option.

The electronic apparatus X18 is an electronic apparatus such as an in-vehicle blower, an oil pump, a water pump, or a battery cooling fan, which includes a high-voltage motor.

Note that the linear power supply 1 described above can be incorporated in any of the electronic apparatuses X11 to X18. The linear power supply 1 with the low input voltage measure as described above can perform appropriate power supply to individual portions of the electronic apparatuses X11 to X18 even if the battery voltage Vbat is momentarily decreased to 2.5 V to 3 V in cold atmosphere.

As a matter of course, applications of the linear power supply 1 are not limited to the electronic apparatuses X11 to X18 mounted in the vehicle X. For example, the linear power supply 1 can be also applied to home appliances or mobile devices. The linear power supply 1 can generate a desired output voltage from an input voltage lower than conventional ones, and hence it is possible to increase operating time of an electronic apparatus including the linear power supply 1.

<Other Variations>

In addition, the various technical features described in this specification can be variously modified within the scope of the technical invention without deviating from the spirit thereof, other than the embodiment described above. For example, bipolar transistors and MOS field-effect transistors can be replaced with each other, and logic levels of various signals can be arbitrarily inverted. In other words, the embodiment described above is merely an example in every aspect and should not be interpreted as a limitation. The technical scope of the present invention is defined not by the above description of the embodiment but by the claims and should be understood to include all modifications within meanings and scopes equivalent to the claims.

INDUSTRIAL APPLICABILITY

The linear power supply described in this specification can be used as an internal power supply of a semiconductor integrated circuit device, for example.

LIST OF REFERENCE SIGNS 1 linear power supply
10 first output transistor (P-channel MOS field-effect transistor)
20 second output transistor (N-channel MOS field-effect transistor)
30 control circuit
31 first control unit
32 second control unit
100 electronic apparatus
110 preregulator (linear power supply)
120 reference voltage source
130 main regulator
131 P-channel MOS field-effect transistor 132 feedback voltage generation unit
133 operational amplifier
200 electronic apparatus
210 reference voltage source (linear power supply)
220 comparator
P1 to P6 P-channel MOS field-effect transistor
N1, N2 N-channel MOS field-effect transistor
Q1 NPN bipolar transistor
DS1, DS2 diode array
D1 to D6 diode
ZD1, ZD2 zener diode
CS1, CS2 current source
R1 to R4 resistor
X vehicle
X11 to X18 electronic apparatus

The invention claimed is:

1. A linear power supply comprising:
a P-channel or PNP first output transistor connected between an input terminal of an input voltage and an output terminal of an output voltage;
an N-channel or NPN second output transistor connected in parallel to the first output transistor; and
a control circuit arranged to switch between a first mode and a second mode in accordance with the input voltage, the first mode using the first output transistor as the output transistor to generate the output voltage from the input voltage, and the second mode using the second output transistor as the output transistor to generate the output voltage from the input voltage,
wherein
the control circuit includes:
a first control unit arranged to generate a first control voltage according to the input voltage so as to supply the first control voltage to the first output transistor, and
a second control unit arranged to generate a predetermined second control voltage so as to supply the second control voltage to the second output transistor, and
the first control unit includes
an upper side current source connected between the input terminal of the input voltage and a control terminal of the first output transistor so as to generate an upper side current,
a lower side current source connected between the control terminal of the first output transistor and a ground terminal so as to generate a lower side current, and
an input voltage monitoring unit arranged to turn on/off the upper side current source in accordance with the input voltage.

2. The linear power supply according to claim 1, wherein the control circuit selects the first mode in a low input voltage condition and selects the second mode in a non-low input voltage condition.

3. The linear power supply according to claim 1, wherein the first control unit turns on/off the first output transistor in accordance with a result of comparison between the input voltage and a predetermined threshold value voltage.

4. The linear power supply according to claim 3, wherein the input voltage monitoring unit is arranged to turn on/off the upper side current source in accordance with the result of comparison between the input voltage and the threshold value voltage.

5. The linear power supply according to claim 4, wherein the input voltage monitoring unit includes a current source having a first terminal connected to an application terminal of the input voltage,
a diode or a diode array having an anode connected to a second terminal of the current source and a cathode connected to a control terminal of the upper side current source, and
a zener diode having a cathode connected to the control terminal of the upper side current source and an anode connected to the ground terminal.

6. A linear power supply comprising:
a P-channel or PNP first output transistor connected between an input terminal of an input voltage and an output terminal of an output voltage;
an N-channel or NPN second output transistor connected in parallel to the first output transistor; and
a control circuit arranged to switch between a first mode and a second mode in accordance with the input voltage, the first mode using the first output transistor as the output transistor to generate the output voltage from the input voltage, and the second mode using the second output transistor as the output transistor to generate the output voltage from the input voltage,
wherein
the control circuit includes
a first control unit arranged to generate a first control voltage according to the input voltage so as to supply the first control voltage to the first output transistor, and
a second control unit arranged to generate a predetermined second control voltage so as to supply the second control voltage to the second output transistor, and
the first control unit gradually changes a conduction degree of the first output transistor in accordance with the input voltage.

7. The linear power supply according to claim 6, wherein the first control unit includes
an upper side current source connected between the input terminal of the input voltage and the control terminal of the first output transistor so as to generate an upper side current,
a lower side current source connected between the control terminal of the first output transistor and a ground terminal so as to generate a lower side current, and
an input voltage monitoring unit arranged to gradually change current value of the upper side current in accordance with the input voltage.

8. The linear power supply according to claim 7, wherein the input voltage monitoring unit includes
a diode or a diode array having an anode connected to an application terminal of the input voltage,
a resistor having a first terminal connected to a cathode of the diode or the diode array, and
a current mirror arranged to mirror a current flowing from a second terminal of the resistor so as to generate an input monitoring current, and wherein
the upper side current source generates the upper side current in accordance with the input monitoring current.

9. The linear power supply according to claim 1, wherein the second control unit includes
a zener diode having a cathode connected to a control terminal of the second output transistor and an anode connected to a ground terminal, and
a current source arranged to supply a constant current to the zener diode.

10. An electronic apparatus comprising:
the linear power supply according to claim 1 arranged to generate the output voltage from the input voltage; and
a reference voltage source arranged to generate a predetermined reference voltage from the output voltage.

11. The electronic apparatus according to claim 10, wherein the control circuit performs switching from the first mode to the second mode after the input voltage becomes higher than a voltage obtained by adding an on threshold voltage of the second output transistor to an operable voltage of the reference voltage source.

12. A linear power supply comprising:
a P-channel or PNP first output transistor connected between an input terminal of an input voltage and an output terminal of an output voltage;
an N-channel or NPN second output transistor connected in parallel to the first output transistor; and
a control circuit arranged to switch between a first mode and a second mode in accordance with the input voltage, the first mode using the first output transistor as the output transistor to generate the output voltage from the input voltage, and the second mode using the second output transistor as the output transistor to generate the output voltage from the input voltage,
wherein, when the first output transistor is on, the input monitoring current does not flow in the control circuit and, when the second output transistor is on, the input monitoring current flows in the control circuit.

13. The linear power supply according to claim 12, wherein the control circuit selects the first mode in a low input voltage condition and selects the second mode in a non-low input voltage condition.

14. The linear power supply according to claim 12, wherein the control circuit includes a first control unit arranged to generate a first control voltage according to the input voltage so as to supply the first control voltage to the first output transistor, and a second control unit arranged to generate a predetermined second control voltage so as to supply the second control voltage to the second output transistor.

15. The linear power supply according to claim 14, wherein the first control unit turns on/off the first output transistor in accordance with a result of comparison between the input voltage and a predetermined threshold value voltage.

16. The linear power supply according to claim 14, wherein the first control unit gradually changes a conduction degree of the first output transistor in accordance with the input voltage.

17. A linear power supply comprising:
a P-channel or PNP first output transistor connected between an input terminal of an input voltage and an output terminal of an output voltage;
an N-channel or NPN second output transistor connected in parallel to the first output transistor; and
a control circuit arranged to switch between a first mode and a second mode in accordance with the input voltage, the first mode using the first output transistor as the output transistor to generate the output voltage from the input voltage, and the second mode using the second output transistor as the output transistor to generate the output voltage from the input voltage,
wherein
the control circuit includes:
a first control unit arranged to generate a first control voltage according to the input voltage so as to supply the first control voltage to the first output transistor, and
a second control unit arranged to generate a predetermined second control voltage so as to supply the second control voltage to the second output transistor,
the first control unit turns on/off the first output transistor in accordance with a result of comparison between the input voltage and a predetermined threshold value voltage,
the first control unit includes:
an upper side current source connected between the input terminal of the input voltage and a control terminal of the first output transistor so as to generate an upper side current,
a lower side current source connected between the control terminal of the first output transistor and a ground terminal so as to generate a lower side current, and
an input voltage monitoring unit arranged to turn on/off the upper side current source in accordance with the result of comparison between the input voltage and the threshold value voltage, and
the input voltage monitoring unit includes:
a current source having a first terminal connected to an application terminal of the input voltage,
a diode or a diode array having an anode connected to a second terminal of the current source and a cathode connected to a control terminal of the upper side current source, and
a zener diode having a cathode connected to the control terminal of the upper side current source and an anode connected to the ground terminal.

* * * * *